No. 12,112.

REISSUED MAY 19, 1903

A. W. TRESCOTT.

SCHOLAR'S COMPANION.

APPLICATION FILED MAR. 17, 1903.

WITNESSES:

F. W. Burt

M. R. Seely

INVENTOR:

Anna Wayne Trescott by Spear & Seely Attorneys.

No. 12,112. Reissued May 19, 1903.

UNITED STATES PATENT OFFICE.

ANNA WAYNE TRESCOTT, OF OAKLAND, CALIFORNIA.

SCHOLAR'S COMPANION

SPECIFICATION forming part of Reissued Letters Patent No. 12,112, dated May 19, 1903.

Original No. 687,412, dated November 26, 1901. Application for reissue filed March 17, 1903. Serial No. 148,261.

*To all whom it may concern:*

Be it known that I, ANNA WAYNE TRESCOTT, a citizen of the United States, residing at Oakland, county of Alameda, State of California, have invented an Improvement in Scholars' Companions; and I hereby declare the following to be a full, clear, and exact description of the same.

My invention relates to a scholar's companion adapted as an attachment for school-desks and which is especially designed for the reception of such instruments and articles as are used about the desk and which are ordinarily kept in boxes made for the purpose.

The object of my invention is to provide a convenient holder for pencils, pens, erasers, rulers, and like instruments, the holder being of such a nature as to prevent the noise and clatter usually caused by the removal and replacing of these articles when the class has been ordered to use them.

My invention consists of the parts and the construction and combination of parts hereinafter described and claimed.

Figure 1:
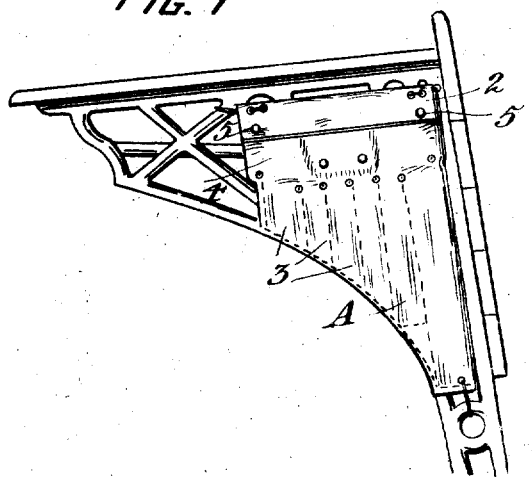
Figure 2:
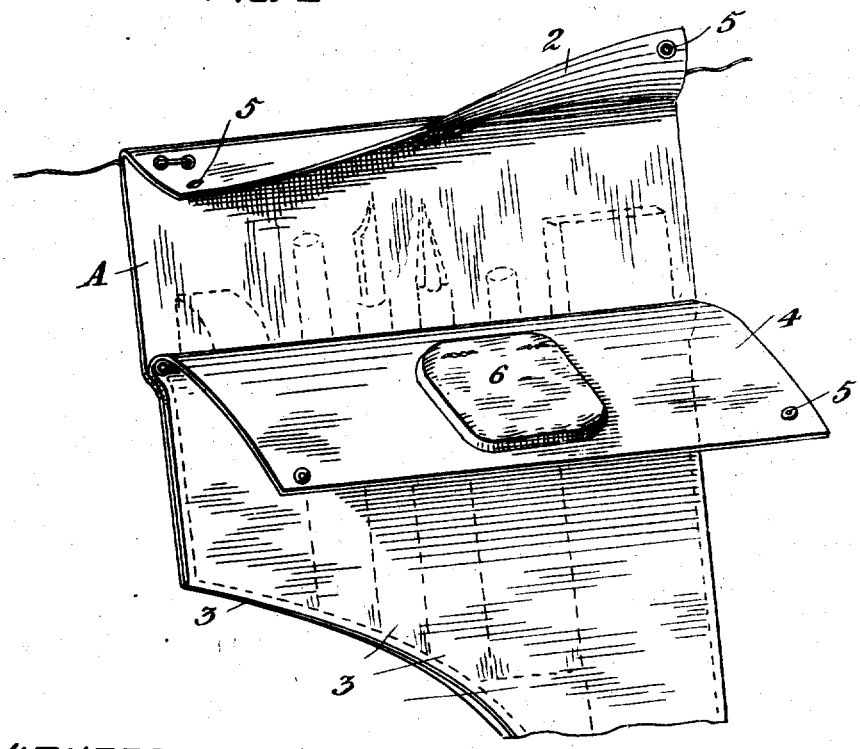

Referring to the accompanying drawings, Figure 1 shows the attachment in its place. Fig. 2 is a view of the detached attachment.

A is the body portion of the device, which I have here shown as made of a single thickness of denim or other fibrous or flexible material, and having at the top a flap 2.

The lower portion of the device is made double or having a series of pockets 3 for the reception of a ruler, pens, pencil, eraser, and like instruments which are used in schools. Near the upper edge of the double portion is attached a flap 4, having suitable buttons or equivalent fastenings 5. The separation of the various pockets may be made by eyelets or other fastenings passing through the two parts, and these at the same time form the hinge or line about which the flap may be turned up after the instruments have been placed in their respective pockets. The upper edge of this flap extends beneath the flap 2 at the top, and the latter, folding down over it, is secured by buttons, hooks, or other suitable fastening, so as to securely inclose the instruments and prevent any ingress of dust.

The device is shaped to fit the curvature of the desk-frame, to which it is here shown as attached, the long side having a pocket of sufficient depth to receive a ruler of twelve or eighteen inches in length, which extends down by the side of the longer leg of the desk, while the rear portion is curved to approximately correspond with the curvature of the desk-frame, as shown, and this curved and shorter portion is of sufficient depth to receive pens, pencils, and eraser, respectively. On the inside of the flap may be attached a pen-wiping device, as at 6, so that when the flap is opened and the instruments in use this pen-wiper is conveniently exposed.

The device is conveniently secured upon the side of the desk-frame by cords, wires, or other suitable attachments, and hanging close against the side of the frame and beneath the end extension of the desk-top it is entirely out of the way.

Having thus described my invention, what I claim as new, and desire to secure by Letters Patent, is—

1. A scholar's companion, made longer upon one side than the other, so as substantially to conform to the end frame of a school-desk, and provided with means for attaching it to said desk beneath the overhang of the desk-top.

2. A scholar's companion made longer upon one side than the other, so as substantially to conform to the end frame of a school-desk, having means for attaching it to said desk beneath the overhanging top of the latter, and provided with separate receptacles for various implements.

3. A scholar's companion consisting of a receptacle made longer upon one side than the other, so as substantially to conform to the end frame of a school-desk, the lower part being made double and separated into vertical compartments of different depths, a flap adapted to close upwardly, a second flap folding down from the top and connecting with the first-named flap, and means for attaching the device to the desk-frame.

4. A scholar's companion consisting of a flexible sheet made longer upon one side than the other and conforming to the side of the desk-frame, the lower part being made double and separated into vertical compartments of different depth for the reception of instruments, a flap foldably attached along the upper line of the doubled portion adapted to fold upwardly, a second flap folding down from the top and overlapping the first-named flap, means for securing the two together, and means for attaching the device to the desk-frame.

In testimony whereof I have affixed my signature, in presence of two witnesses, this 19th day of February, 1903.

ANNA WAYNE TRESCOTT.

Witnesses:

L. W. SEELEY,

F. M. BURT.